United States Patent [19]
Back et al.

[11] Patent Number: 5,559,459
[45] Date of Patent: Sep. 24, 1996

[54] CLOCK SIGNAL GENERATION ARRANGEMENT INCLUDING DIGITAL NOISE REDUCTION CIRCUIT FOR REDUCING NOISE IN A DIGITAL CLOCKING SIGNAL

[75] Inventors: Paul R. Back, Groton; Paul R. Carlin, Bolton; Joseph M. Lamb, Hopedale, all of Mass.

[73] Assignee: Stratus Computer, Inc., Marlboro, Mass.

[21] Appl. No.: 366,414

[22] Filed: Dec. 29, 1994

[51] Int. Cl.$^6$ .................................................. H03K 19/00
[52] U.S. Cl. .............................. 326/93; 327/292; 326/11
[58] Field of Search .......................... 326/93, 94; 327/292, 327/298

[56] References Cited

U.S. PATENT DOCUMENTS

| | | | |
|---|---|---|---|
| 3,900,741 | 8/1975 | Fletcher | 326/11 |
| 4,239,982 | 12/1980 | Smith | 327/292 |
| 4,375,683 | 3/1983 | Wensley | 326/11 |
| 4,839,855 | 8/1989 | Van Driel | 327/292 |
| 4,984,241 | 1/1991 | Truong | 326/11 |
| 5,036,221 | 7/1991 | Brucculeri et al. | 326/94 |
| 5,239,215 | 8/1993 | Yamaguchi | 327/292 |

*Primary Examiner*—Edward P. Westin
*Assistant Examiner*—Andrew Sanders
*Attorney, Agent, or Firm*—Richard A. Jordan

[57] ABSTRACT

A clock signal generation arrangement for generating clocking signals for use in a fault-tolerant computer system generates a timing signal in response to a common clock signal. The clock signal generation arrangement comprises a system clock signal generator and a clock signal recovery circuit interconnected by a plurality of clock signal transfer lines. The system clock signal generator generates, in response to a common clock signal, a plurality of system clock signals preferably of uniform frequency and phase for transmission over a like plurality of clock signal transfer lines. The clock signal recovery circuit receives the system clock signals from the clock signal transfer lines and generates a unitary timing signal. The clock signal recovery circuit includes a voting circuit, a latch circuit and a latch control circuit. The voting circuit generates a voted clock signal having signal transitions that are generally aligned with transitions of a majority of the system clock signals. The latch circuit has alternating set and reset conditions in response to transitions of the voted clock signal, and generates the timing signal to have transitions corresponding to the latch circuit's respective set and reset conditions. Finally, the latch control circuit inhibits the latch circuit from transitioning between its set and reset conditions for a selected time period after a previous transition therebetween, so that the latch circuit will be insensitive to noise in the voted clock signal following such a transition.

11 Claims, 3 Drawing Sheets

5,559,459

CLOCK SIGNAL GENERATION ARRANGEMENT INCLUDING DIGITAL NOISE REDUCTION CIRCUIT FOR REDUCING NOISE IN A DIGITAL CLOCKING SIGNAL

FIELD OF THE INVENTION

The invention relates generally to the field of digital circuitry and more specifically to circuitry for generating a low-noise digital clocking signal. The invention provides a clock signal generating arrangement digital noise reduction circuit that receives a potentially noisy clocking signal and generates in response a filtered clocking signal that is generally free of noise for a selected time period following a signal transition.

BACKGROUND OF THE INVENTION

Digital computer systems are used in a number of applications in which virtually continuous, error free operation is important to the operation of businesses or other entities using the systems. For example, in banking, computer systems are used to maintain account information and update account balances, and it is important for a bank to be able to provide accurate and up-to-date account information virtually instantaneously. Similarly, computers are used to monitor and control of airplane traffic, and around crowded airports and along major air corridors, it is vital that the computers be configured so that the air traffic control systems are continuously available. Computers are also used to control switching systems for the public telephone system, and it is similarly important that the computers be configured provision be made so that the telephone systems be continuously available.

It is generally possible to build computer systems which have extremely reliable components to accomplish tasks such as these and numerous others, and to provide preventive maintenance in such a way and with such frequency that failures are extremely improbable. However, such high-reliability computer systems would be extremely expensive to build and maintain. Accordingly, "fault-tolerant" computer systems have been developed, which is generally designed with the expectation that one or more element of the system may fail at some point in its operation, but that if an element does fail, other elements are available to detect the failure and ensure that the system will continue to give proper results. Such fault-tolerant computer systems will generally be much less expensive to build and maintain, since they may be constructed of components which individually are of lower reliability than those of high-reliability computer systems, and thus would cost less to build, and maintenance costs would also be lower. Fault-tolerant computer systems generally include redundant components which operate in parallel, and when a fault is detected in one element the other components are available to continue operation. A number of schemes may be used to detect a fault, such as fault detection circuitry which can detect certain types of faults. In addition, if a fault-tolerant system includes at least, for example, three processing components operating in parallel, the system can compare outputs of the three components and, if the outputs of two of the processing components agree but the output the third processing element differs from that of the other two, the system can with a high degree of confidence draw the inference that the one processing component is faulty and its output should be ignored and that the outputs from the two processing components which agree with each other are correct and should be used.

In order to ensure that the processing components of a fault-tolerant computer system are operating in parallel, so that their outputs can be properly compared, it is generally desirable that they all operate on the same program and data, and that they be synchronized in parallel by a common clock. Since a single clock may also fail, which would cause the entire system to stop operating, redundancy may also be provided in the clocking system, which is resolved at each of the elements which use the clock. However, certain types of failures in the clocking system can cause undesirable noise, which can also cause the processing components of the system to operate improperly.

SUMMARY OF THE INVENTION

The invention provides a new and improved clock signal generation arrangement that includes a digital noise reduction circuit for reducing noise in a digital clocking signal.

In brief summary, the new clock signal generation arrangement generates clocking signals for use in a fault-tolerant computer system generates a timing signal for use by a timing signal utilization device, such as one or more processor modules, in response to a common clock signal. The clock signal generation arrangement comprises a system clock signal generator and a clock signal recovery circuit interconnected by a plurality of clock signal transfer lines. The system clock signal generator generates, in response to a common clock signal, a plurality of system clock signals preferably of uniform frequency and phase. The clock signal transfer lines receive the system clock signals from the system clock signal generator and couple them to said timing signal utilization device. The clock signal recovery circuit receives the system clock signals from the clock signal transfer lines and generates in response a unitary timing signal for use by the timing signal utilization device. In one embodiment, the clock signal recovery circuit includes a voting circuit, a latch circuit and a latch control circuit. The voting circuit generates a voted clock signal having signal transitions that are generally aligned with transitions of a majority of the system clock signals. The latch circuit has alternating set and reset conditions in response to transitions of the voted clock signal, and generates the timing signal to have transitions corresponding to the latch circuit's respective set and reset conditions. Finally, the latch control circuit inhibits the latch circuit from transitioning between its set and reset conditions for a selected time period after a previous transition therebetween, so that the latch circuit will be insensitive to noise in the voted clock signal following such a transition.

BRIEF DESCRIPTION OF THE DRAWINGS

This invention is pointed out with particularity in the appended claims. The above and further advantages of this invention may be better understood by referring to the following description taken in conjunction with the accompanying drawings, in which:

DETAILED DESCRIPTION OF AN ILLUSTRATIVE EMBODIMENT

Figure 1:
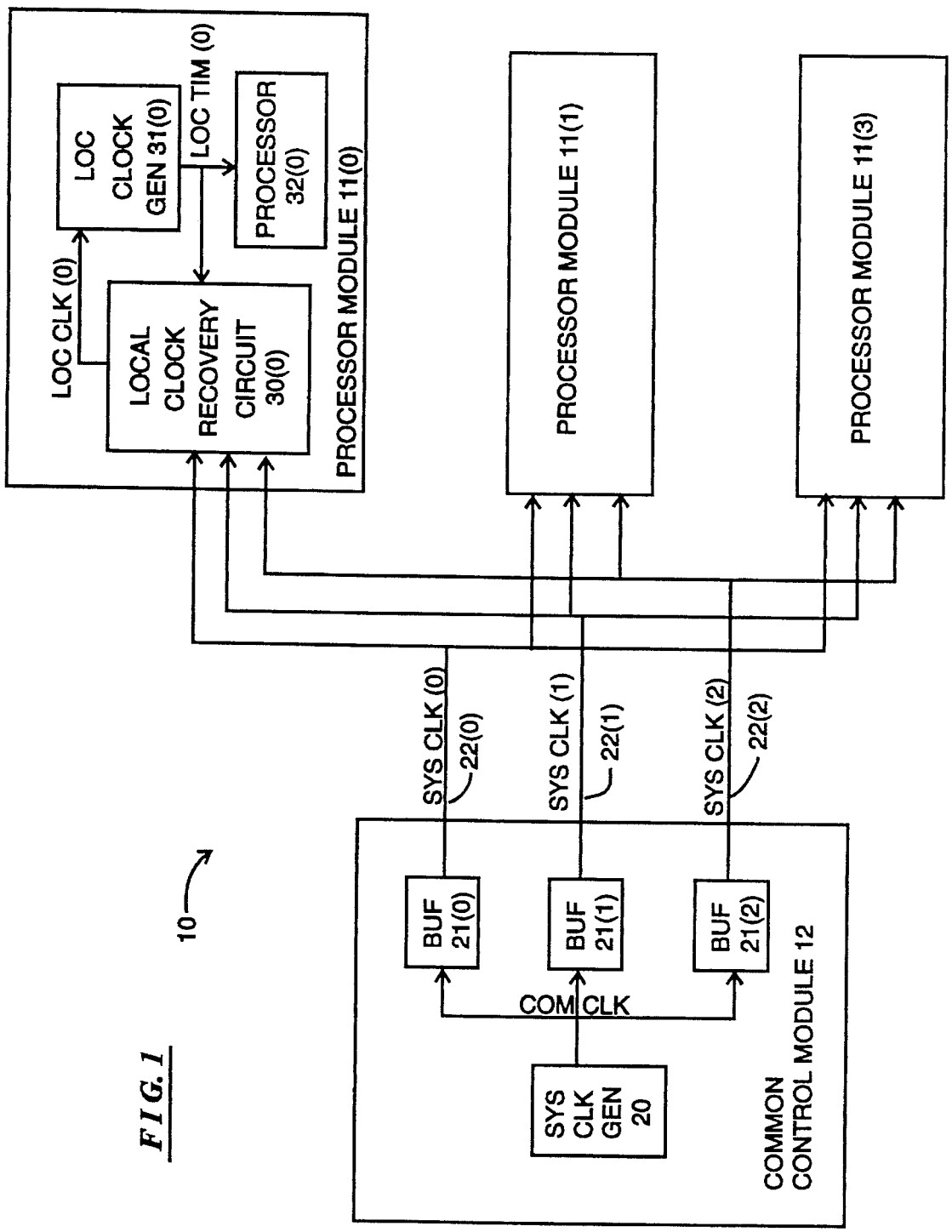
FIG. 1 is a general block diagram depicting an illustrative computer system including a digital noise reduction circuit constructed in accordance with the invention.

FIG. 1 is a general block diagram depicting an illustrative computer system 10 including a digital noise reduction circuit constructed in accordance with the invention. In one embodiment, the new digital noise reduction circuit is used in a computer system 10 that is generally constructed in a "fault tolerant" manner. As shown in FIG. 1, the computer system 10 includes a plurality of processor modules 11(0) through 11(2) [generally referred to herein by reference numeral 11(i)] controlled by a common control module 12. The processor modules 11(i) perform processing in parallel in response to timing and control information from the common control module 12. Processing by the processor modules 11(i) is monitored by external circuitry (not shown) to verify correct operation of the processor modules 11(i). If the external circuitry determines, by monitoring certain status signals generated by the processor modules 11(i) or by comparing processed information generated thereby, that one or more of the processor modules 11(i) is operating in a faulty manner, it may enable downstream utilization elements (also not shown) that normally receive and use processed information from the processor modules 11(i) to use only processed information from the processor modules 11(i) that are determined not to be operating improperly and to ignore the processed information from the faulty processor modules 11(i), thereby providing a computer system 10 which is tolerant of faulty operation by at least some of its components.

As noted above, the common control module 12 provides timing and control information to the processor modules 11(i) to enable them to operate in parallel. In particular, the common control module 12 generates, among other signals, a plurality of system clock signals SYS CLK (0) through SYS CLK (2) [generally identified by reference numeral SYS CLK (j)] that are distributed in parallel to the processor modules 11(i). Each processor module 11(i) includes a local clock recovery circuit 30(i) for generating, in response to the SYS CLK (j) system clock signals, individual LOC CLK (i) local clock signals that control the operations of processing circuitry in each of the respective processor modules 11(i). As will be described below in detail, the local clock recovery circuit 30(i) on each processor module 11(i) will generate the LOC CLK (i) local clock signal even if one of the SYS CLK (j) signals is faulty, further enhancing the fault-tolerant nature of the computer system 10.

More specifically, the common control module 12 includes a system clock generator 20 that generates a single common clock signal COM CLK and distributes it to a plurality of buffers 21(0) through 21(2) [generally identified by reference numeral 21(j)]. Each buffer 21(j), in turn, receives the COM CLK common clock signal and generates a correspondingly-indexed SYS CLK (j) system clock signal, which it couples in a conventional manner on a signal line 22(j) for transmission in parallel to the processor modules 11(i). In one particular embodiment, each SYS CLK (j) system clock signal is preferably a differential signal, in which case the correspondingly-indexed signal line 22(j) actually will comprise two signal wires. Each buffer 21(j) is constructed to receive the single-ended (that is, non-differential) COM CLK common clock signal and generate the correspondingly-indexed SYS CLK (j) system clock signal in differential form. The buffers 21(j) each have generally the same circuit design and they will thus generate the SYS CLK (j) system clock signals so that their edges rise and fall generally in unison, but it will be appreciated that differing gate delays and other characteristics of the circuits comprising the diverse buffers will cause slight differences among timings of their respective rising edges and falling edges.

The processor modules 11(i) are generally similar, and so only processor module 11(0) is shown in more detail in FIG. 1. Each processor module 11(i) includes a local clock recovery circuit 30(i) that is connected to all of the differential signal lines 22(j) and receives therefrom all of the SYS CLK (j) system clock signals. In each processor module 11(i), the local clock recovery circuit 30(i) uses all of the SYS CLK (j) system clock signals to generate a unitary LOC CLK (i) signal to, in turn, control the phasing of a local phase-locked loop-based local clock circuit 22(i). The local clock generator circuit 31(i) of each processor module 11(i), in turn, generates a plurality of local timing signals LOC TIM (i) of differing frequencies and phases that control timing of various circuits comprising processing circuitry 32(i) of the respective processor module 11(i).

Although the system 10 has been described as having three processor modules 11(i) and three SYS CLK (j) system clock signals, it will be appreciated that any number of processor modules 11(i) and any number of SYS CLK (j) system clock signals may be provided. In addition, the number of processor modules 11(i) (three in the system 10 shown in FIG. 1) and the number of SYS CLK (j) system clock signals (also three) need not be the same. However, if at least three processor modules 11(i) are provided, the external monitoring circuitry (not shown) can generally determine when one of the processor modules 11(i) has failed as described above and enable only the outputs of the other two processor modules to be used by the utilization circuitry. Similarly, if at least three SYS CLK (j) signals are provided, the local clock recovery circuits 31(i) of the processor modules 11(i) can still recover an appropriate clocking signal as described below.

Figure 2:
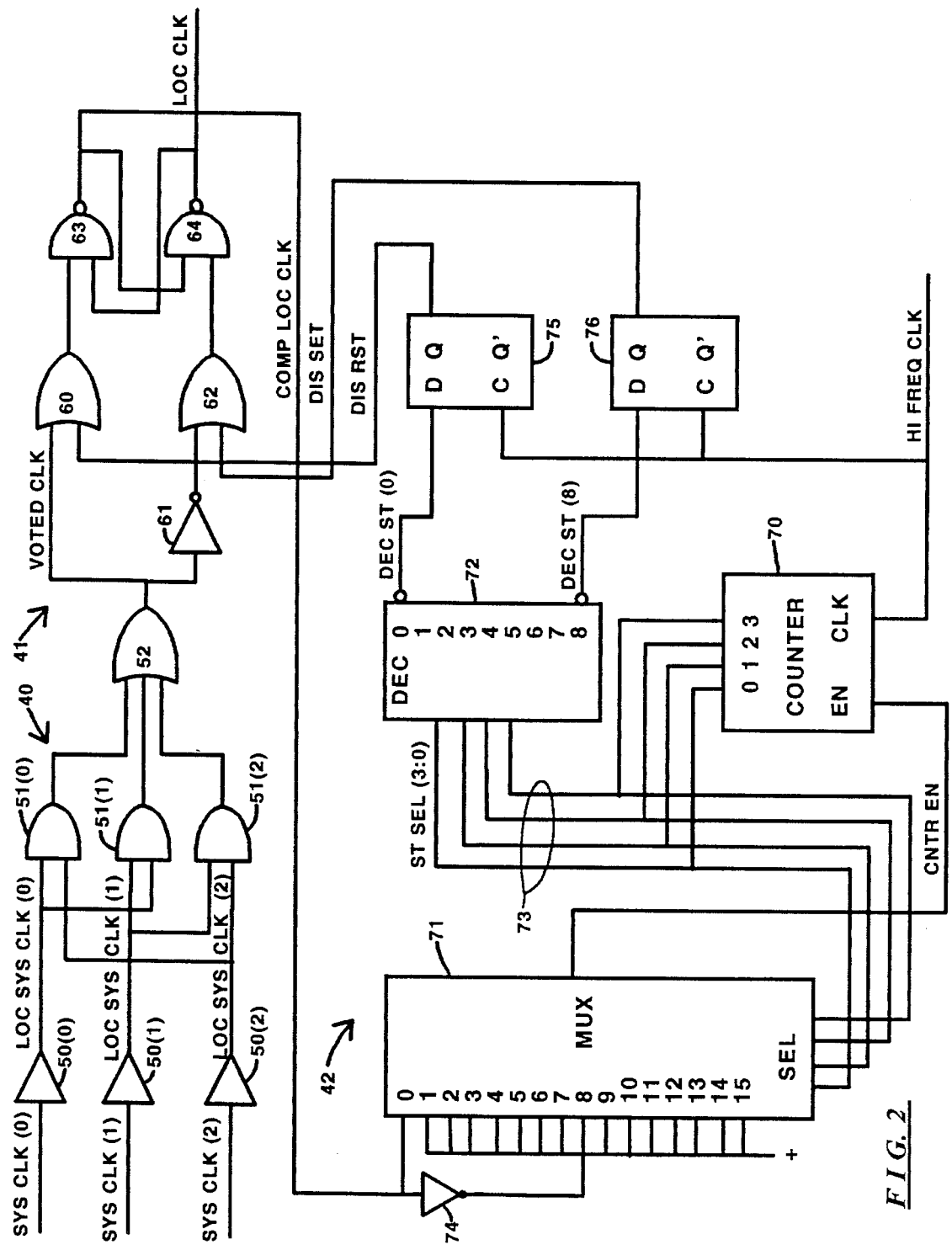
FIG. 2 is a schematic logic diagram depicting details of a local clock recovery circuit including the new digital noise reduction circuit.

A detailed logic diagram of the local clock recovery circuit 30(i) is depicted in FIG. 2. With reference to that FIG., the local clock recovery circuit 30(i) includes a voter circuit 40, a latch circuit 41 and a latch control state machine circuit 42. Generally, the voter circuit 40 receives the three differential SYS CLK (j) system clock signals from the differential signal lines 22(j), converts each differential signal to a single-ended (that is, non-differential) form, and generates in response a single voted output signal VOTED CLK that generally represents a "majority vote" of the three SYS CLK (j) signals. The transition of the VOTED CLK voted clock signal between asserted and negated states controls the setting and resetting of the latch circuit 41, which, in turn, results in transition of the LOC CLK (i) local clock signal generated by the local clock recovery circuit 30(i) between asserted and negated states. Differences in phasing of the SYS CLK (j) signals as received by the voter circuit 40, and differences in gate delays and other circuit characteristics of signal paths in the voter circuit 40 related to each SYS CLK (j) signal, as described below, may cause noise in the rising and falling edges of the VOTED CLK voted clock signal. The latch control state machine circuit 42 controls the times at which the latch circuit 41 can enable the LOC CLK (i) signal to transition from an asserted condition to a negated condition, or from a negated condition to an asserted condition, and thereby effectively reduce the amount of noise that may be present in the VOTED CLK signal that might otherwise find its way into the LOC CLK (i) local clock signal.

More specifically, and with reference to FIG. 2, the voter circuit 40 includes three input buffers 50(0) through 50(2) [generally identified herein by reference numeral 50(j)] each connected to one of the differential signal lines 22(j). Each buffer 50(j) receives the correspondingly-indexed differential SYS CLK (j) system clock signal and generates in response a single-ended (non-differential) LOC SYS CLK (j) local system clock signal. The LOC SYS CLK (j) local system clock signals are coupled pair-wise to a plurality of AND gates 51(0) through 51(2) [generally identified by reference numeral 51(k)]. Thus, AND gate 51(0) receives the LOC SYS CLK (0) and LOC SYS CLK (2) signals, AND gate 51(1) receives the LOC SYS CLK (0) and LOC SYS CLK (1) signals, and AND gate 51(2) receives the LOC SYS CLK (1) and LOC SYS CLK (2) signals. As is conventional, each AND gate 51(k) will generate an output signal which will be negated when either of the LOC SYS CLK (j) signals coupled thereto is in the negated state, and which will transition to an asserted state when both of the LOC SYS CLK (j) signals have transitioned to an asserted state. The output signals from the AND gates 51(k) are all coupled to input terminals of an OR gate 52, which generates a VOTED CLK voted clock signal, which is asserted if any of the output signals from the AND gates 51(k) is asserted, and negated otherwise. The VOTED CLK voted clock signal, in turn, is coupled to the latch circuit 41.

It will be appreciated that, if the SYS CLK (j) signals as received by the buffers 50(j) from the common control module 12 are all in phase, if the buffers 50(j) all have the same gate delays, and if the AND gates 51(k) also all have the same gate delays, the output signals from the AND gates 51(k) will all transition from asserted to negated conditions and from negated to asserted conditions in unison. However, since the SYS CLK (j) signals as received by the buffers 50(j) will have at least some slight phase differences due to differences among delays through buffers 21(j) (FIG. 1) and propagation delays along lines 22(j), and since generally the gate delays through buffers 50(j) and AND gates 51(k) will not be perfectly matched, the output signals from the AND gates 51(k) will generally not transition between asserted and negated conditions perfectly in phase. However, the VOTED CLK voted clock signal from OR gate 52 will transition between the asserted condition and the negated condition in response to the first corresponding transition among the output signals from the AND gates 51(k).

The VOTED CLK voted clock signal from OR gate 52 is coupled to control the latch circuit 41. More particularly, the "true" of VOTED CLK signal is coupled to one input terminal of an OR gate 60, and the "complement" of the VOTED CLK signal, generated by an inverter 61, is coupled to one input terminal of an OR gate 62. The respective output signals from OR gates 60 and 62 are coupled to respective input terminals of a pair of cross-connected NAND gates 63 and 64 which generate the LOC CLK local clock signal. While both a DIS SET disable set signal and a DIS RST disable reset signal from the latch control circuit 42 are asserted, the OR gates 60 and 62 are both energized and the VOTED CLK signal from the OR gate 52 is blocked from controlling the NAND gates 63 and 64. However, if the DIS SET disable set signal is negated, the OR gate 62 may be controlled by the complement of the VOTED CLK voted clock signal, generated by inverter 61, to cause the NAND gates 63 and 64 to set to assert the LOC CLK local clock signal. On the other hand, if the DIS RST disable reset signal is negated, the OR gate 60 may be controlled by the VOTED CLK voted clock signal to cause NAND gates 63 and 64 to reset to negate the LOC CLK local clock signal. As will be described below, the latch control circuit 42 will assert both the DIS SET disable set and DIS RST disable reset signals during a selected period of time following the transition of the LOC CLK local clock signal from the asserted condition to the negated condition, and from the negated condition to the asserted condition, which effectively filters noise from the VOTED CLK voted clock signal for the selected period following the transition, which, in turn, provides a generally noise-free copy of the COM CLK common clock signal to the local clock generator 31(j) (FIG. 1).

More specifically, if the latch circuit 41 is initially reset, so that the NAND gate 64 is generating a negated LOC CLK signal and NAND gate 63 is generating an asserted COMP LOC CLK complement local clock signal, the VOTED CLK voted clock signal will also be negated, in which case the inverter 61 will be providing an asserted complement VOTED CLK signal to OR gate 62. After the DIS SET disable set signal is negated, if the VOTED CLK voted clock signal shifts to an asserted condition, the complement VOTED CLK signal from inverter 61 will energize the OR gate 62 to generate a negated output signal. Since the COMP LOC CLK signal from NAND gate 63 is asserted, the negated output signal from the OR gate 62 enables the NAND gate to generate an asserted LOC CLK local clock signal, which is coupled to the local clock generator 31(i). The assertion of the LOC CLK local clock signal by the NAND gate 64 is also coupled to one input terminal of the NAND gate 63. Since the DIS RST disable reset signal is at this point still asserted, the OR gate 60 also provides an asserted input signal to the other input terminal of NAND gate 63. In addition, since both input terminals of the NAND gate 63 receive asserted input signals, the NAND gate 63 negates the COMP LOC CLK complement local clock signal.

The latch control circuit 42, in response to the negation of the COMP LOC CLK complement local clock signal from NAND gate 63, asserts both the DIS SET disable set and DIS RST disable reset signals for the selected period following the transition. It will be appreciated that the assertion of the DIS SET signal at this point (the DIS RST signal continues to be asserted) will not alter the condition of the NAND gates 63 and 64. This follows from the facts that (a) since the COMP LOC CLK complement local clock signal is negated, thereby de-energizing one input of the NAND gate 64, the NAND gate 64 will maintain the LOC CLK local clock signal in the asserted state regardless of the state of the signal from OR gate 62, and (b) since the VOTED CLK voted clock signal continues to be asserted, the signals input to NAND gate 63 do not change with the assertion of the DIS SET disable set signal. At the end of the selected period, the latch control circuit 42 will negate the DIS RST disable reset signal, as described below.

At some point following negation of the DIS RST disable reset signal, the voter circuit 40, in particular the OR gate 52, will shift the VOTED CLK voted clock signal to a negated condition. In that condition, the asserted VOTED CLK signal from inverter 61 will enable the OR gate 60 to generate a negated output signal. Since the LOC CLK signal from NAND gate 63 is asserted, the negated output signal from the OR gate 60 enables the NAND gate 63 to generate an asserted COMP LOC CLK complement local clock signal. The assertion of the COMP LOC CLK complement local clock signal by the NAND gate 63 is also coupled to one input terminal of the NAND gate 64. Since the DIS SET disable set signal is at this point still asserted, the OR gate 62 also provides an asserted input signal to the other input terminal of NAND gate 64. In addition, since both input terminals of the NAND gate 64 receive asserted input signals, the NAND gate 64 negates the LOC CLK local clock signal.

The latch control circuit 42, in response to the assertion of the COMP LOC CLK complement local clock signal from NAND gate 63, asserts both the DIS SET disable set and DIS RST disable reset signals for the selected period following the transition of the VOTED CLK voted clock signal. It will be appreciated that the assertion of the DIS RST disable reset signal at this point (the DIS SET disable set signal continues to be asserted) will not alter the condition of the NAND gates 63 and 64. This follows from the facts that (a) since the LOC CLK local clock signal is negated, thereby de-energizing one input of the NAND gate 63, the NAND gate 63 will maintain the COMP LOC CLK complement local clock signal in the asserted state regardless of the state of the signal from OR gate 60, and (b) the signals input to NAND gate 64 do not change with the assertion of the DIS RST disable reset signal. At the end of the selected period, the latch control circuit 42 will negate the DIS SET disable set signal, as described below, which returns the latch circuit 41 and latch control circuit 42 to the initial condition described above.

The latch circuit 41 and latch control circuit 42 will repeat these operations with succeeding transitions of the VOTED CLK voted clock signal, so that the transitions and state of the LOC CLK local clock signal from the latch circuit 41 follows the transitions and state of the VOTED CLK signal. The latch control circuit 42 is provided to disable the latch circuit 41 from changing condition for a selected period of time after it has changed condition. One benefit of this will be clear from the following discussion. It will be appreciated that, in the event of a fault along one of the paths from the COM CLK signal source, namely, the system clock generator 20 (FIG. 1), to the OR gate 52 of the local clock recovery circuit 30(i) of a processor module 11(i), the voter circuit 40 will still enable the OR gate 52 to generate a valid VOTED CLK signal. For example, if there is a fault along the circuit comprising the buffer 21(0), line 22(0), and buffer 50(0), such that the LOC SYS CLK (0) is constantly in a negated condition, AND gates 51(0) and 51(1) will not be able to provide an asserted output signal. In that case, if the circuit paths for the other system clock signals SYS CLK (1) and SYS CLK (2) from the common control module 12 are still operating properly, the AND gate 51(2) will clearly be able to provide an appropriate output signal. On the other hand, if the LOC SYS CLK (0) signal is constantly in an asserted condition, AND gates 51(0) and 51(1) will essentially be controlled by the LOC SYS CLK (2) and LOC SYS CLK (1) signals, respectively, so that each AND gates 51(0) and 51(1) will generate an asserted output signal only when the respective LOC SYS CLK (2) and LOC SYS CLK (1) signal is asserted.

Continuing with the SYS CLK (0) path example from the previous paragraph, if there is a different type of fault in the SYS CLK (0) path from the common control module 12 to a processor module 11(i), such as if the SYS CLK (0) signal is floating between the asserted and the negated state (which can occur if, for example, one of the wires comprising the differential signal line 22(0) is broken), the LOC SYS CLK (0) signal generated by the buffer 50(0) may rapidly transition between its asserted and negated condition. The AND gates 51(0) and 51(1) will receive this rapidly oscillating signal, and, when the respective LOC SYS CLK (2) or LOC SYS CLK (1) signal is asserted, will generate a corresponding rapidly-oscillating output signal. Until the LOC SYS CLK (1) and LOC SYS CLK (2) signals are both asserted, to enable the AND gate 51(2) to generate an asserted output signal, the OR gate 52 will be coupling the oscillating output signal from the AND gate 51(0) or 51(1) to the latch 41, which would control the latch 41 response be rapidly set and reset. The latch control circuit 42 is provided to disable latch 41 from rapidly changing its condition for at least a selected period of time after it has transitioned from an asserted condition to a negated condition or from a negated condition to an asserted condition. If the selected period of time is long enough to ensure that, continuing with the above example, the LOC SYS CLK (1) and LOC SYS CLK (2) signals will both be asserted or negated, the faulty oscillatory LOC SYS CLK (0) signal will have no effect on the operation of the local clock recovery circuit 30(i) or, in turn, of the processor module 11(i).

Figure 3:
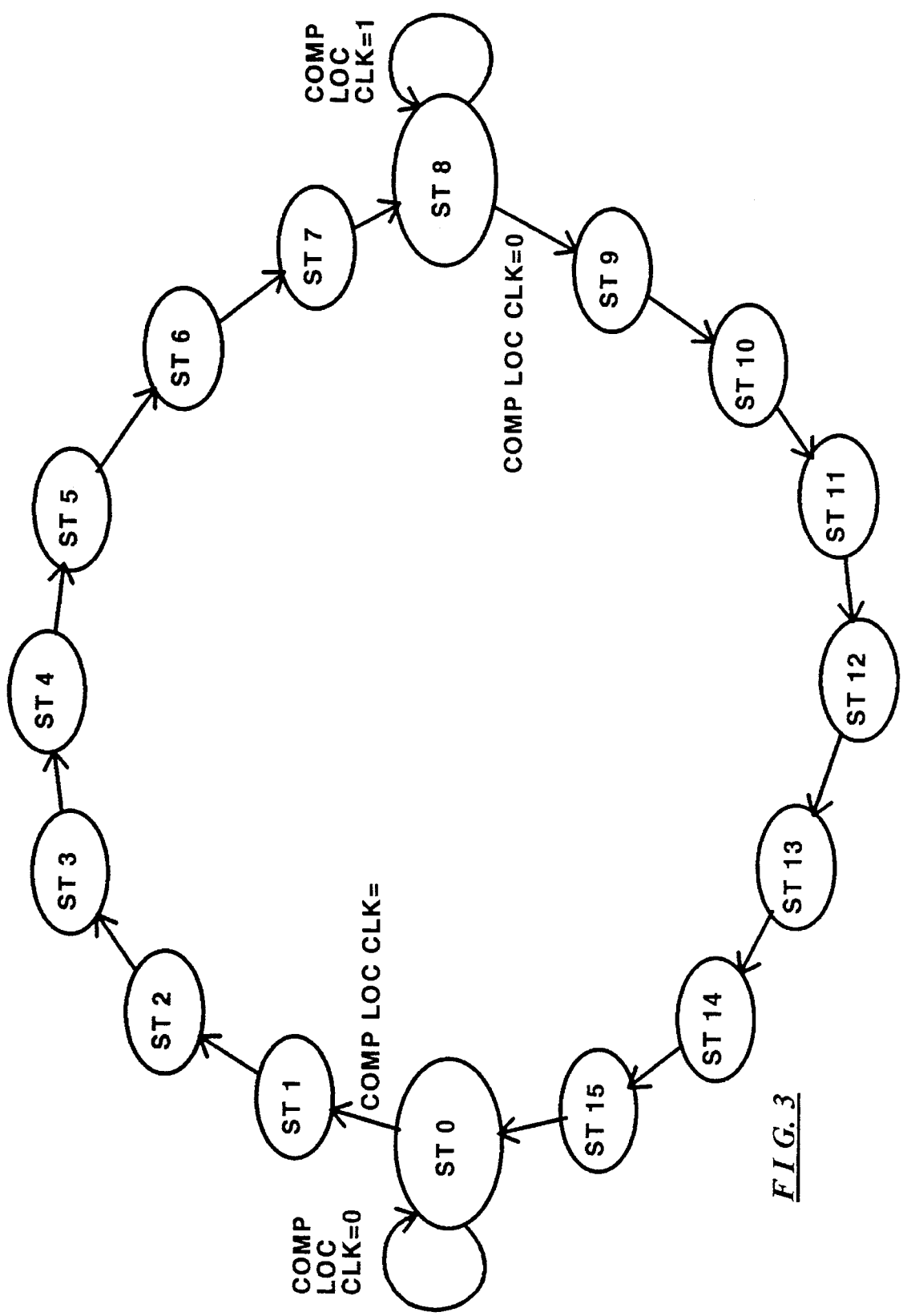
FIG. 3 is a state transition diagram useful in understanding the operation of the digital noise reduction circuit depicted in FIG. 2.

The structure and operation of the latch control circuit 42 will be described in detail in connection with FIGS. 2 and 3. The schematic logical structure of the latch control circuit 42 is shown in FIG. 2, and FIG. 3 depicts a state diagram which is useful in understanding the operation of the latch control circuit 42. With reference to those FIGs., the latch control circuit 42 includes a counter 70 and a multiplexer 71, which cooperate to form a state machine that operates in response to the COMP LOC CLK complementary local clock signal from the NAND gate 63 and a high-frequency clock signal HI FREQ CLK from the local clock generator 31(i). In addition, the latch control circuit 42 includes a decoder 72 and two flip-flops 75 and 76, which generate the DIS RST disable reset and DIS SET disable set signals to disable the latch circuit 41 from changing condition for particular series of states of the state machine formed by counter 70 and multiplexer 71.

The counter 70 defines sixteen states, as shown in the state diagram depicted in FIG. 3. In FIG. 3, each state is shown as a bubble, with the particular state associated with the bubble being identified by the legend "ST i" where "i" is an integer from zero to fifteen. The counter 70, while it is enabled, advances with successive ticks of the HI FREQ CLK high frequency clock signal from the local clock generator 31(i). It will be appreciated that the number of states and the frequency of the HI FREQ CLK high frequency clock signal will preferably be related to the length of a preferred "selected time period," over which the latch circuit 41 is to be disabled from changing state, which, in turn, is related to the time period following a transition over which the VOTED CLK voted clock signal is likely to be noisy.

The multiplexer 71 selectively enables and disables the counter 70 as a function of both the COMP LOC CLK complementary local clock signal and the particular state the latch control circuit 42 is in. More specifically, as is shown in FIG. 3, in response to the COMP LOC CLK complementary local clock signal transitioning from, for example, the negated condition to the asserted condition, the counter 70 advances from state zero to state eight. While the counter 70 is advancing, the latch control circuit 42 generates both the DIS SET disable set and DIS RST disable reset signals to have asserted conditions. The asserted DIS SET disable set and DIS RST disable reset signals will enable both OR gates to, in unison, generate asserted output signals, which will maintain the NAND gates 63 and 64 in their respective conditions to hold the LOC CLK local clock and COMP LOC CLK complementary local clock signals negated and asserted, respectively. Since both the DIS SET disable set and DIS RST disable reset signals are asserted over this time period, changes in condition of the VOTED CLK voted clock signal from the OR gate 52 will not affect the output signals from the OR gates 60 and 62. Accordingly, over the time period during which the counter 70 of the latch control circuit 42 is advancing from state zero to state eight, the latch control circuit 42 ensures that noise in the VOTED CLK voted clock signal from OR gate 52 will not affect the condition of the latch circuit 41.

In state eight, the latch control circuit negates the DIS SET disable set signal, thereby removing the asserted signal controlling OR gate 62 and allowing the complement VOTED CLK voted clock signal to control the OR gate 62. Also in state eight, the asserted COMP LOC CLK complementary local clock signal causes the counter 70 to be disabled, as shown in FIG. 3 (the arrow labeled "COMP LOC CLK=1" adjacent the bubble labeled "ST 8") in a manner to be described below. The counter 70 will remain disabled until the VOTED CLK voted clock signal from OR gate 52 is asserted. When the VOTED CLK voted clock signal is asserted, the OR gate 60 will generate the asserted output signal which, in turn, enables the NAND gate 63 to generate a negated COMP LOC CLK complementary local clock signal. The negated COMP LOC CLK complementary local clock signal enables the NAND gate 64, in turn, to assert the LOC CLK local clock signal for transmission to the local clock generator 31(i) (FIG. 1).

The negated COMP LOC CLK complementary local clock signal also enables the counter 70 to again begin advancing. With successive ticks of the HI FREQ CLK high frequency clock signal, the counter 70 will advance through states nine through fifteen and return to state zero. While the counter 70 is advancing through states nine through fifteen, the latch control circuit 42 will again hold the DIS SET disable set and DIS RST disable reset signals in their asserted conditions, ensuring that both OR gates 60 and 62 generate asserted output signals, regardless of the condition of the VOTED CLK voted clock signal from OR gate 52, and thereby maintaining the NAND gates 63 and 64 in the same conditions they had when the counter 70 was in state nine.

When the counter 70 again returns to state zero, the negated COMP LOC CLK complementary local clock signal will again disable the counter 70 from advancing, as shown in FIG. 3 (the arrow labeled "COMP LOC CLK=0" adjacent the bubble labeled "ST 0"). While the counter 70 is in state zero, the latch control circuit will negate the DIS RST disable reset signal, which also enables the VOTED CLK voted clock signal to control the OR gate 60 as described above. It will be appreciated that, since the time period represented by the transition from state eight through state fifteen and back to state zero is preferably selected to ensure that the VOTED CLK signal will be settled in a generally noiseless negated condition, the inverter 61 will be providing a generally reliable asserted input signal to OR gate 62, in which case the VOTED CLK voted clock signal will ensure that the NAND gates 63 and 64 will be maintained in the appropriate conditions even though the DIS RST disable reset signal is negated.

In any case, while the counter 70 is stalled in state zero, and the DIS SET disable set signal is asserted, at some point the VOTED CLK voted clock signal from OR gate 52 will transition from the negated condition to the asserted condition. When that occurs, the inverter 61 will also generate a negated output signal, de-energizing the OR gate 62, and enabling it to generate a negated output signal. The negated output signal from OR gate 62, in turn, causes the NAND gates 63 and 64 to switch conditions as described above, so that the NAND gate 64 generates a negated LOC CLK local clock signal, and the NAND gate 63 generates an asserted COMP LOC CLK complementary local clock signal. The negated LOC CLK local clock signal is coupled to control the local clock generator 31(i) as described above, and the asserted COMP LOC CLK complementary local clock signal enables the counter 70 to advance from state zero, as shown in FIG. 3 (the arrow labeled "COMP LOC CLK=1" between states labeled "ST 0" and "ST 1") and as described above. These operations will be repeated for successive transitions of the VOTED CLK voted clock signal from OR gate 52, thereby ensuring that the LOC CLK local clock signal is relatively free of the oscillatory and other forms of noise that can occur due to faults in the SYS CLK (i) system clock signals from the common control module 12.

More specifically, the counter 70 generates binary encoded ST SEL (3:0) state select signals which it couples over lines 73 to select input terminals "SEL" of the multiplexer 71 and to the input terminal of the decoder 72. The ST SEL (3:0) signals essentially form a single binary-encoded signal which represents binary-encoded values that define and identify each of the sixteen states. The decoder 72 receives the ST SEL (3:0) state select signals and generates output signals that identify the value represented by those ST SEL (3:0) state select signals. In particular, the decoder 72 generates asserted output signals through all of its output terminals, except for the output terminal corresponding to the value represented by the ST SEL (3:0) state select signals, so that a DEC ST (0) decoded state signal will be negated when the ST SEL (3:0) state select signals identify the value zero, a DEC ST (8) decoded state signal will be negated when the ST SEL (3:0) state select signals identify the value eight, and both DEC ST (0) and DEC ST (8) signals will be asserted otherwise. The DEC ST (0) and DEC ST (8) and are coupled to the flip-flops 75 and 76, respectively. The DEC ST (0) and DEC ST (8) signals enable the respective flip-flops to be set, when the respective signal is asserted, or reset, when the respective signal is negated, in response to the HI FREQ CLK high frequency clock signal from the local clock generator 31(i). The flip-flop 75 generates the DIS RST disable reset signal, and so the DIS RST signal will be asserted except when the DEC ST (0) signal is negated, which occurs during state zero when the binary-encoded SEL ST (3:0) signals represent the value zero. Similarly, the flip-flop 76 generates the DIS SET disable set signal, and so the DIS SET signal will be asserted except when the DEC ST (8) signal is negated, which occurs during state eight when the binary-encoded SEL ST (3:0) signals represent the value eight.

The multiplexer 71 enables the counter to advance from states zero to eight and from states eight to fifteen, and to stall in states zero and eight thereby to enable the negation of the DIS RST disable reset and DIS SET disable set signals, respectively in those states. In that operation, the multiplexer 71 receives the ST SEL (3:0) signals and selects in response one of its sixteen input terminals whose input signal it couples to its output terminal. The input terminals "1" through "7" and "9 through "15" of multiplexer 71 are connected to receive an asserted input signal, as indicated by the "+" symbol shown in FIG. 2. However, the input terminals "0" and "8" are connected to receive the true and complement, respectively, of the COMP LOC CLK complementary local clock signal from NAND gate 63 of the latch circuit 41. The complement of the COMP LOC CLK signal is generated by an inverter 74 which is shown connected between terminals "0" and "8" of the multiplexer 71. The CNTR EN counter enable output signal from the multiplexer 71 is, in turn, connected to an enable input terminal "EN" of the counter 70.

Accordingly, when the binary-encoded ST SEL (3:0) state select signal defines the value zero, the multiplexer 71 couples the COMP LOC CLK complementary local clock signal as the CNTR EN counter enable to the enable input terminal of the counter 70. In that case, while the COMP LOC CLK signal is negated, the CNTR EN counter enable signal is also negated and so counter 70 is disabled from advancing. On the other hand, when the COMP LOC CLK complementary local clock signal transitions from the negated condition to the asserted condition, the CNTR EN counter enable signal also shifts to the asserted condition, which, in turn, enables the counter 70 to advance with the first tick of the HI FREQ CLK high frequency clock signal from the local clock generator 31(i). As described above, this occurs when the VOTED CLK voted clock signal from OR gate 52 transitions from an asserted condition to a negated condition. At that point, the counter 70 will generate binary-encoded ST SEL (3:0) state select signals which have a value "one."

When the counter 70 generates binary-encoded ST SEL (3:0) state select signals which have a value "one," the multiplexer 71 will couple the asserted input signal at its input terminal "1" through its output terminal as the CNTR EN counter enable signal. This maintains the counter 70 in an enabled condition, and it will continue advancing so that, with the next tick of the HI FREQ CLK high frequency clock signal, it will generate the binary-encoded ST SEL (3:0) state select signals to have the value "two." Since the input terminals "2" through "7" of multiplexer 71 have the same asserted input signal as input terminal "1," these operations will be repeated with successive ticks of the HI FREQ CLK high frequency clock signal, so that the counter 70 will generate the binary-encoded ST SEL (3:0) signals to represent values "three" through "eight."

Similarly, when the binary-encoded ST SEL (3:0) state select signal defines the value eight, the multiplexer 71 couples the complement of the COMP LOC CLK complementary local clock signal, generated by inverter 74, as the CNTR EN counter enable to the enable input terminal of the counter 70. In that case, while the COMP LOC CLK signal is asserted, the CNTR EN counter enable signal is again negated and so counter 70 is disabled from advancing. On the other hand, when the COMP LOC CLK complementary local clock signal transitions from the asserted condition to the negated condition, so that the complement of the COMP LOC CLK signal transitions from the negated to the asserted condition, the CNTR EN counter enable signal also shifts to the asserted condition, which, in turn, enables the counter 70 to advance with the first tick of the HI FREQ CLK high frequency clock signal from the local clock generator 31(i). As described above, this occurs when the VOTED CLK voted clock signal from OR gate 52 transitions from an negated condition to a asserted condition. At that point, the counter 70 will generate binary-encoded ST SEL (3:0) state select signals which have a value "nine."

When the counter 70 generates binary-encoded ST SEL (3:0) state select signals which have a value "nine," the multiplexer 71 will couple the asserted input signal at its input terminal "9" through its output terminal as the CNTR EN counter enable signal. This maintains the counter 70 in an enabled condition, and it will continue advancing so that, with the next tick of the HI FREQ CLK high frequency clock signal, it will generate the binary-encoded ST SEL (3:0) state select signals to have the value "ten." Since the input terminals "10" through "15" of multiplexer 71 have the same asserted input signal as input terminal "9," these operations will be repeated with successive ticks of the HI FREQ CLK high frequency clock signal, so that the counter 70 will generate the binary-encoded ST SEL (3:0) signals to represent values "nine" through "fifteen," and back to "zero." At that point, the multiplexer 71 and counter will have returned to state zero, and will repeat the operations as described above.

As described above, the number of states for the latch control circuit 42 and the frequency of the HI FREQ CLK high frequency clock signal from the local clock generator 31(i) which controls advancement of the latch control circuit 42 through successive states are preferably selected so that the "selected time period" over which the DIS SET disable set and DIS RST disable reset signals are both asserted, disabling the latch circuit 41 from changing state, is generally as long as the VOTED CLK voted clock signal may be noisy following a transition. Preferably the selected time period will be somewhat less than the time between VOTED CLK voted clock signal transitions, so that the latch circuit 41 will be in condition to be set or reset, respectively, in response to a transition in the VOTED CLK voted clock signal. In one particular embodiment, in which the COM CLK common clock signal, and thus the SYS CLK (i) system clock and VOTED CLK voted clock signals, have frequencies on the order of eight megahertz, the HI FREQ CLK high frequency clock signal from the local clock generator 31(i) has a frequency on the order of five hundred and seventy-six megahertz. In that situation, the "selected time period" will be between one-fourth and one-fifth of the period of the eight megahertz VOTED CLK signal.

The foregoing description has been limited to a specific embodiment of this invention. It will be apparent, however, that various variations and modifications may be made to the invention, with the attainment of some or all of the advantages of the invention. It is the object of the appended claims to cover these and such other variations and modifications as come within the true spirit and scope of the invention.

What is claimed as new and desired to be secured by Letters Patent of the United States is:

1. A clock signal generation arrangement for generating a unitary timing signal for use by a timing signal utilization device in response to a common clock signal, the clock signal generation arrangement comprising:

A. a system clock signal generator for generating, in response to the common clock signal, a plurality of system clock signals of uniform frequency and phase; and B. a clock signal recovery circuit for receiving the system clock signals from the system clock signal generator and for generating in response the unitary timing signal for use by the timing signal utilization device, the clock signal recovery circuit generating the unitary timing signal to have signal transitions that are generally aligned with transitions of a majority of the system clock signals, the clock signal recovery circuit inhibiting transitions of the unitary timing signal for a selected time period after a previous transition so as to inhibit generation of noise in the unitary timing signal following such a transition.

2. A clock signal generation arrangement as defined in claim 1 in which said clock signal recovery circuit includes:

A. a voting circuit for generating a voted clock signal having signal transitions that are generally aligned with transitions of a majority of the system clock signals;

B. a latch circuit controlled to have alternating set and reset conditions in response to transitions of the voted clock signal, the latch circuit generating the unitary timing signal having transitions corresponding to its respective set and reset conditions, and C. a latch control circuit for inhibiting the latch circuit from transitioning between its set and reset conditions for a selected time period after a previous transition therebetween, so that the latch circuit will be insensitive to noise in the voted clock signal following such a transition.

3. A clock signal generation arrangement as defined in claim 2 in which the voting circuit includes:

A. a plurality of coincidence circuits each connected to receive a majority of the system clock signals from said system clock signal generator and for generating in response an majority output signal representing the coincidence of the system clock signals received thereby; and B. an OR circuit for receiving the majority output signals from the coincidence circuits and for generating the voted clock signal in response thereto.

4. A clock signal generation arrangement as defined in claim 2 in which said latch circuit includes a flip-flop circuit having a set condition and a reset condition, the flip-flop circuit generating the unitary timing signal to have an asserted condition when in the set condition and a negated condition when in the reset condition.

5. A clock signal generation arrangement as defined in claim 4 in which the flip-flop has a set input terminal and a reset input terminal for selectively controlling the conditioning of said flip-flop to said set condition or said reset condition in response to said voted clock signal, said latch control circuit generating a disable set signal for disabling said set input terminal and a disable reset signal for disabling said reset input terminal for a selected period of time after said latch circuit has transitioned between said set condition and said reset condition.

6. A clock signal generation circuit as defined in claim 5 in which said latch control circuit includes:

A. a state counter for generating output signals defining a series of successive states;

B. a state decoder for generating said disable set and disable reset signals when the state counter is generating output signals defining selected ones of said states and for negating respective ones of said disable set and disable reset signals when the state counter is generating output signals defining others of said states; and C. a counter control circuit for enabling the state counter to advance to successive states, thereby enabling the state decoder to generate the disable set and disable reset signals in response to a transition of said unitary timing signal between said asserted and negated conditions, and otherwise to selectively negate respective ones of said disable set and disable reset signals thereby to enable the latch circuit to transition from between said set condition and said reset condition.

7. A clock signal recovery circuit for use in connection with a system clock signal generator that generates a plurality of system clock signals of uniform frequency and phase, the clock signal recovery circuit generating a unitary timing signal in response to said plurality of system clock signals, the clock signal recovery circuit comprising:

A. a voting circuit for generating a voted clock signal having signal transitions that are generally aligned with transitions of a majority of the system clock signals;

B. a latch circuit controlled to have alternating set and reset conditions in response to transitions of the voted clock signal, the latch circuit generating the unitary timing signal having transitions corresponding to its respective set and reset conditions, and C. a latch control circuit for inhibiting the latch circuit from transitioning between its set and reset conditions for a selected time period after a previous transition therebetween, so that the latch circuit will be insensitive to noise in the voted clock signal following such a transition.

8. A clock signal recovery circuit as defined in claim 7 in which the voting circuit includes:

A. a plurality of coincidence circuits each connected to receive a majority of the system clock signals and for generating in response an majority output signal representing the coincidence of the system clock signals received thereby; and B. an OR circuit for receiving the majority output signals from the coincidence circuits and for generating the voted clock signal in response thereto.

9. A clock signal recovery circuit as defined in claim 7 in which said latch circuit includes a flip-flop circuit having a set condition and a reset condition, the flip-flop circuit generating the unitary timing signal to have an asserted condition when in the set condition and a negated condition when in the reset condition.

10. A clock signal recovery circuit as defined in claim 9 in which the flip-flop has a set input terminal and a reset input terminal for selectively controlling the conditioning of said flip-flop to said set condition or said reset condition in response to said voted clock signal, said latch control circuit generating a disable set signal for disabling said set input terminal and a disable reset signal for disabling said reset input terminal for a selected period of time after said latch circuit has transitioned between said set condition and said reset condition.

11. A clock signal recovery circuit as defined in claim 10 in which said latch control circuit includes:

A. a state counter for generating output signals defining a series of successive states;

B. a state decoder for generating said disable set and disable reset signals when the state counter is generating output signals defining selected ones of said states and for negating respective ones of said disable set and disable reset signals when the state counter is generating output signals defining others of said states; and C. a counter control circuit for enabling the state counter to advance to successive states, thereby enabling the state decoder to generate the disable set and disable reset signals in response to a transition of said unitary timing signal between said asserted and negated conditions, and otherwise to selectively negate respective ones of said disable set and disable reset signals thereby to enable the latch circuit to transition from between said set condition and said reset condition.

* * * * *